United States Patent
McElroy

(10) Patent No.: US 8,408,076 B2
(45) Date of Patent: Apr. 2, 2013

(54) WEIGHT SENSOR DEVICE

(76) Inventor: Everett McElroy, Cottonwood, AZ (US)

( * ) Notice: Subject to any disclaimer, the term of this patent is extended or adjusted under 35 U.S.C. 154(b) by 413 days.

(21) Appl. No.: 12/817,926

(22) Filed: Jun. 17, 2010

(65) Prior Publication Data

US 2012/0000295 A1 Jan. 5, 2012

(51) Int. Cl.
*G01L 1/00* (2006.01)
*G01L 1/22* (2006.01)

(52) U.S. Cl. .......... 73/862.473; 73/862.474; 73/862.471

(58) Field of Classification Search ............. 73/862.381, 73/862.391, 862.392, 862.393, 826, 828, 73/856, 862.451, 862.471, 862.473, 862.474
See application file for complete search history.

(56) References Cited

U.S. PATENT DOCUMENTS

| | | | |
|---|---|---|---|
| 3,174,334 A | 3/1965 | McKernan | |
| 4,043,191 A * | 8/1977 | Mills | 73/152.62 |
| 4,120,197 A * | 10/1978 | Johansson | 73/862.473 |
| 4,241,616 A | 12/1980 | Mastrigt | |
| 4,265,110 A | 5/1981 | Moulin | |
| 4,287,759 A | 9/1981 | Cooper | |
| 4,509,376 A | 4/1985 | Thomasson | |
| 4,534,228 A | 8/1985 | Burbank, Jr. | |
| 4,587,855 A | 5/1986 | Yamada et al. | |
| 4,679,771 A | 7/1987 | Johnson | |
| 4,833,927 A | 5/1989 | Park | |
| 4,989,450 A | 2/1991 | Shoberg et al. | |
| 5,728,953 A | 3/1998 | Beus et al. | |
| 6,343,515 B1 * | 2/2002 | Dodson | 73/831 |
| 7,011,188 B2 | 3/2006 | Scheuring, III et al. | |
| 7,066,036 B2 | 6/2006 | Ochovo | |
| 7,313,975 B1 * | 1/2008 | Scorteanu | 73/862.454 |
| 7,424,832 B1 | 9/2008 | Nunnelee | |

FOREIGN PATENT DOCUMENTS

| | | |
|---|---|---|
| CN | 2648426 | 10/2004 |
| EP | 2093016 | 1/2009 |
| JP | 1197619 | 8/1989 |

OTHER PUBLICATIONS www.massload.com, Deadline Sensor specification sheet, p. 45.
Checkline by Electromatic, Precision Instruments for Quality Control, Cable Tension Meters web page, pp. 1-2.
ODP Logging Manual, Version 2.0, Apr. 2004, pp. 1-331.

* cited by examiner

*Primary Examiner* — Lisa Caputo
*Assistant Examiner* — Jonathan Dunlap
(74) *Attorney, Agent, or Firm* — Snell & Wilmer L.L.P.

(57) ABSTRACT

The present invention relates to a weight sensor device. The weight sensor device comprises a housing, which includes a receptacle for a load pin and an insert. A cable nest is secured to each end of the housing. In exemplary embodiments, a load pin is engaged in the housing and secures an insert. A cable clamping mechanism may be attached to the insert. In accordance with various exemplary embodiments, the housing itself is non-load sensing.

16 Claims, 7 Drawing Sheets

WEIGHT SENSOR DEVICE

FIELD OF INVENTION

The present invention relates to measuring the tension in a cable. Particularly, this invention relates to determining the weight of a load supported by a cable in drilling operations.

BACKGROUND OF THE INVENTION

In many situations, it is of critical importance to be able to accurately measure the tension on a rope or cable. For example, in oil drilling applications, a cable may be used to support the weight of the drilling apparatus. Typically, the cable is secured at the top of the drilling rig, and may be connected to the drilling equipment which is lowered into the well shaft to perform the drilling operation. When drilling, it is necessary to monitor the weight borne by the support cable to prevent both slack and overload situations. Accurate cable load measurement is necessary to maintain safe working conditions in the drilling operation, as well as to prevent damage to drilling equipment.

In the prior art, cable tension is often measured by in-line load cell devices equipped with strain gages. Strain gages are typically expensive to manufacture and replace, and may be susceptible to fluctuations due to surrounding physical conditions. In addition, many strain gages are integral to the in-line load cell device, and failure of the gages requires extensive repair or replacement of the entire load cell. This replacement may cause significant downtime and additional expense, as the drilling operation must be stopped to remove the load cell from its position on the cable.

In many applications, such as oil drilling, the weight sensor device is used in harsh conditions. Typically, the weight sensor is exposed to dirt and other debris, as well as fluids such as oils and industrial lubricants. In addition, the sensor may be frequently exposed to high pressure steam used to clean components of the oil derrick. These conditions may contribute to premature failure of the weight sensor device.

Therefore, there is a need for an improved weight sensor device which can accurately measure a cable load under such harsh operating conditions and may be repaired quickly and inexpensively.

SUMMARY OF THE INVENTION

The present invention provides a device that accurately measures a cable load under harsh operating conditions and can be repaired quickly and inexpensively. A weight sensor device having features of the present invention comprises a housing, the housing comprising a load pin receptacle and an insert receptacle which intersect with each other. The housing further comprises a cable nest secured to each end of the housing.

In accordance with various exemplary embodiments of the invention, a load pin is inserted into the load pin receptacle in the housing. The load pin engages an insert placed in the insert receptacle. A cable clamping mechanism is attached to the insert.

BRIEF DESCRIPTION OF THE DRAWINGS

The drawings described herein are for illustration purposes only and are not intended to limit the scope of the present disclosure in any way. The present invention will become more fully understood from the detailed description and the accompanying drawings herein.

DETAILED DESCRIPTION

The detailed description of various embodiments herein makes reference to the accompanying drawing figures, which show various embodiments and implementations thereof by way of illustration and its best mode, and not of limitation. While these embodiments are described in sufficient detail to enable those skilled in the art to practice the embodiments, it should be understood that other embodiments may be realized and that mechanical and other changes may be made without departing from the spirit and scope of the invention. Furthermore, any reference to singular includes plural embodiments, and any reference to more than one component may include a singular embodiment.

Also, any reference to attached, fixed, connected or the like may include permanent, removable, temporary, partial, full and/or any other possible attachment option. Additionally, though the various embodiments discussed herein may be carried out in the context of an oil drilling operation, it should be understood that systems and methods disclosed herein may be incorporated into anything needing a device capable of measuring the weight supported by a cable.

The various embodiments of weight sensor device comprise the features hereinafter described and particularly pointed out in the claims. The following description and the annexed drawings set forth in detail demonstrate certain illustrative embodiments of the disclosure. However, these embodiments are indicative of but a few of the various ways in which the principles disclosed herein may be employed. Other objects, advantages and novel features will become apparent from the following detailed description when considered in conjunction with the drawings.

An exemplary weight sensor device is used to measure the weight supported by a cable. The device attaches directly to the cable in an inline configuration. The weight is measured by deflecting the cable and measuring the amount of force required to overcome the deflection of the cable. This force is proportional to the load which the cable supports. An exemplary embodiment of the present weight sensor device may be employed in an oil drilling operation, for example, though other applications may likewise be suitable for weight sensors in accordance with the present invention. Preferably, the weight sensor attaches to a support cable which is used to secure the drilling equipment.

Figure 1:
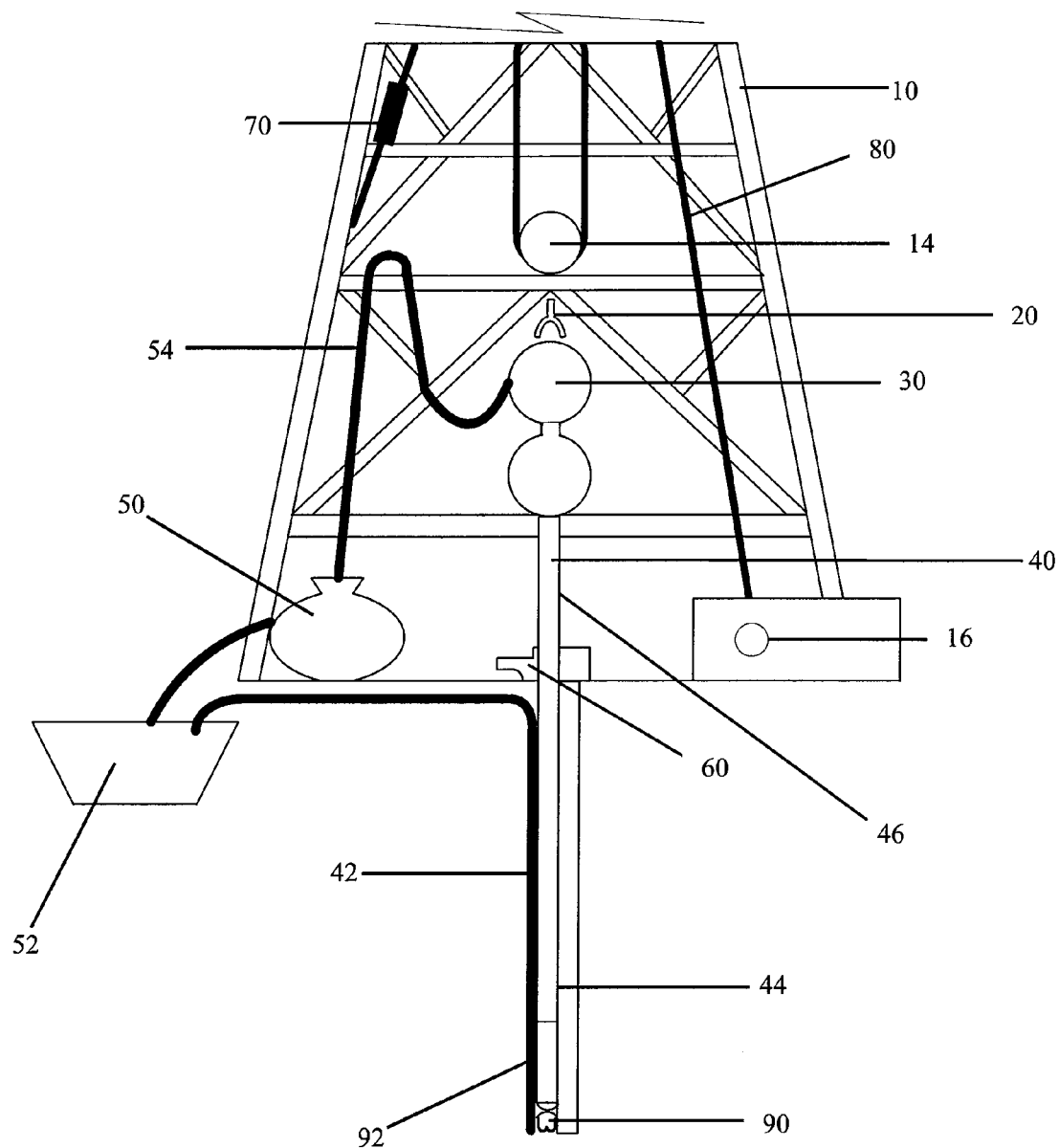
FIG. 1 illustrates a perspective view of an exemplary rotary drill style oil derrick.

To assist in understanding the context of the present weight sensor device, an exemplary oil drilling operation is illustrated in FIG. 1. In a rotary style oil drilling operation, an oil derrick 10 provides support for the required equipment. A crown block (not pictured) supports a support cable 80, which suspends the various drilling components. Support cable 80 passes through crown block and traveling block 14, and is received by draw works 16. Draw works 16 may act as a hoist by drawing in or releasing support cable 80, which allows the drilling equipment to be raised or lowered.

A hook 20 is attached to traveling block 14 and supports the various drilling components. A swivel 30 attaches to hook 20 and connects the hook 20 to a mud hose 54. Mud is pumped through mud hose 54 into a well shaft 92 by mud pump 50. Mud is pumped from a mud pit 52, through the drilling apparatus, and back to mud pit 52.

Mud hose 54 is attached to and supports a drill stem 46. The uppermost part of drill stem 46 is a kelly 40. Kelly 40 is a hollow square or hexagonal length of pipe which a drill pipe 44 passes through. Kelly 40 is rotated by rotary table 60, which causes drill pipe 44 to rotate. Drill pipe 44 travels through a casing 42 and terminates at a bit 90, which is attached to the bottom of drill pipe 44. As drill pipe 44 rotates, bit 90 performs the drilling operation by rotating against the substrate at the bottom of the well shaft 92.

It is important to be able to measure the weight being supported by support cable 80 during the oil drilling operation. In various exemplary embodiments, a weight sensor 70 is attached to support cable 80. In an exemplary embodiment, weight sensor 70 may be attached to the support cable 80 at a point between the crown block and a stationary point on the oil derrick 10. In another exemplary embodiment, weight sensor 70 may be attached to the support cable 80 at a point between drill works 16 and crown block. Weight sensor 70 is configured to measure the load being supported by support cable 80 by measuring the tension in support cable 80. Weight sensor 70 may be configured to output a signal to a readout device (not shown) or computer (not shown). The signal may be interpreted by readout device or computer, and as a result, readout device or computer may display the tension in support cable 80 and/or the weight being supported by support cable 80.

Figure 2:
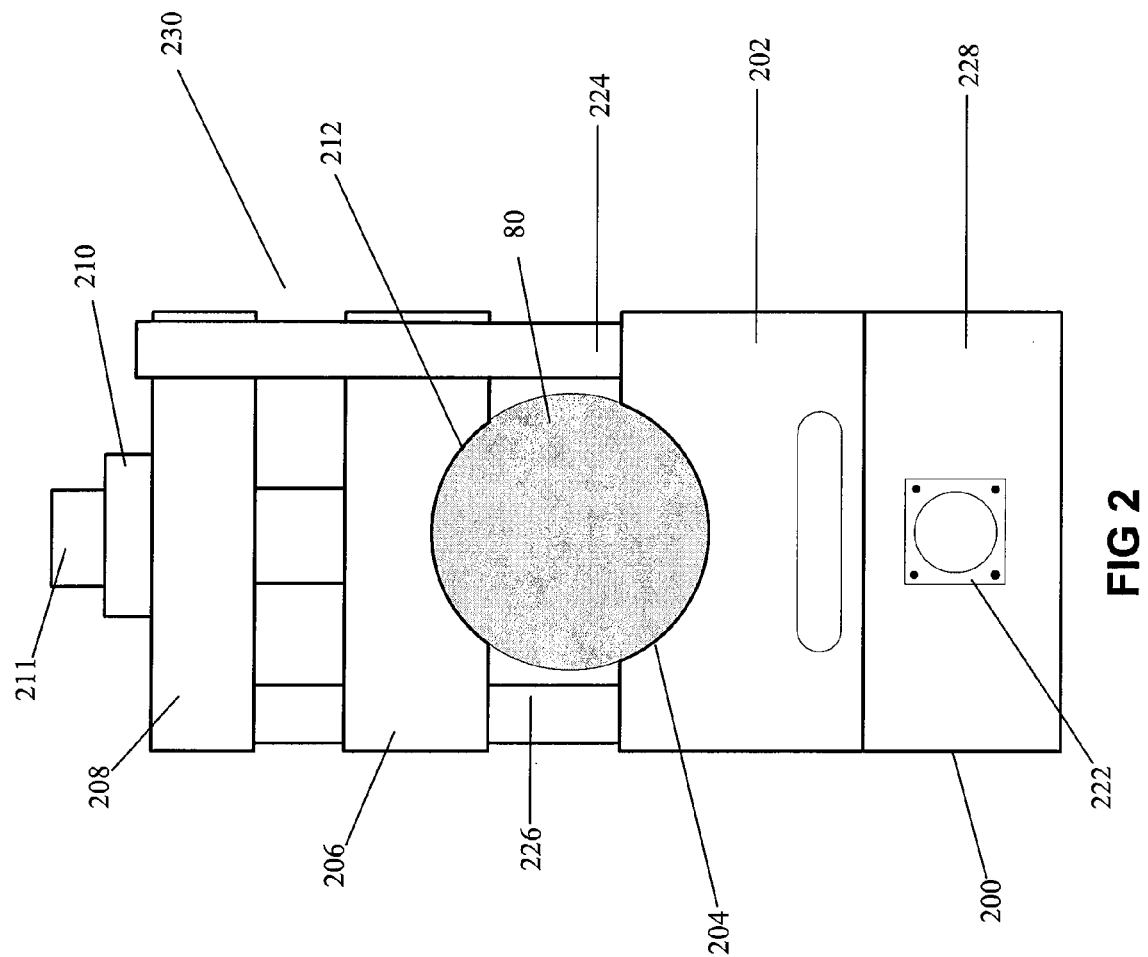
FIG. 2 illustrates a front view of a weight sensor device according to an embodiment.
Figure 3:
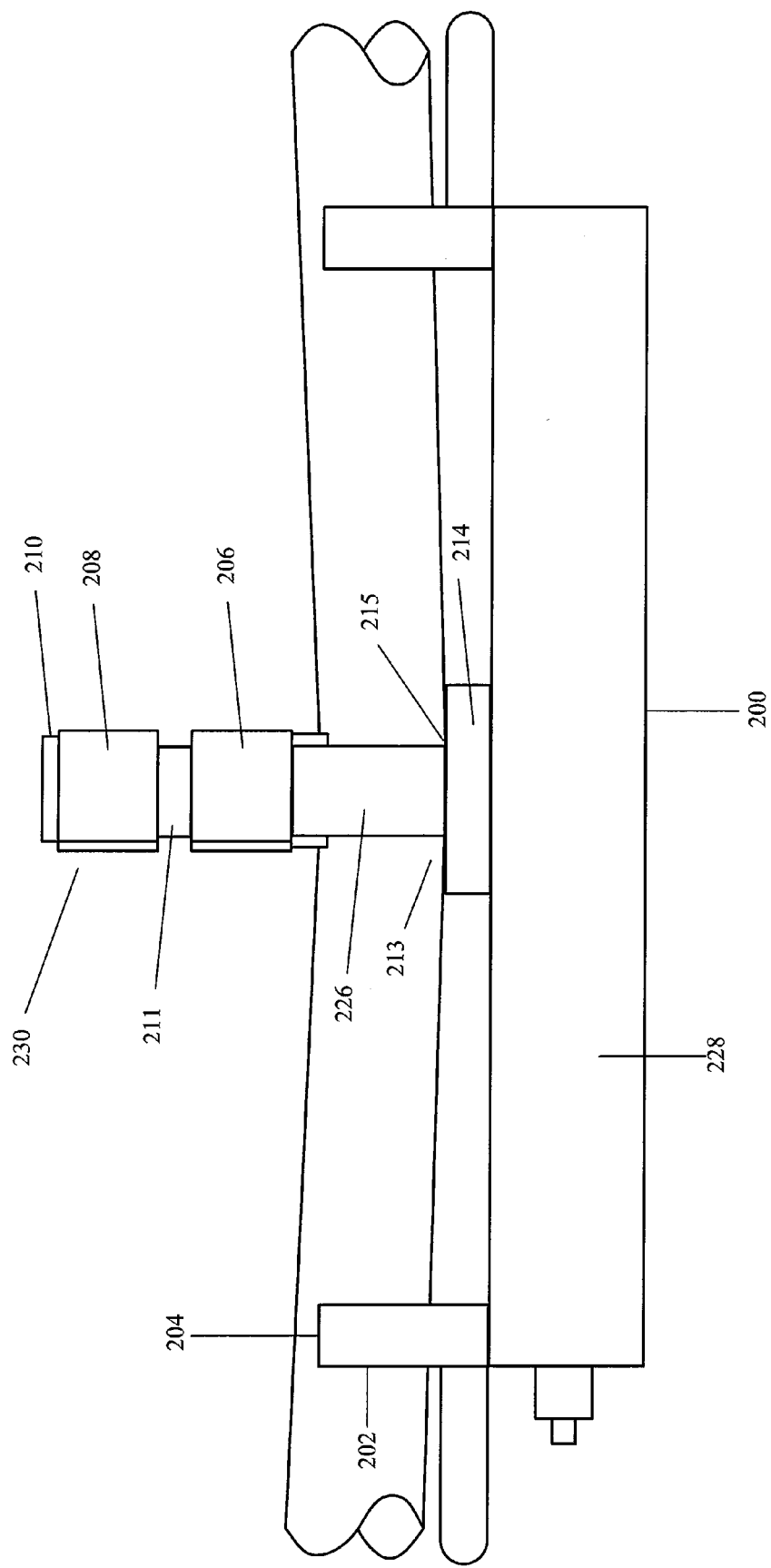
FIG. 3 illustrates an end view of a weight sensor device according to an embodiment.
Figure 4:
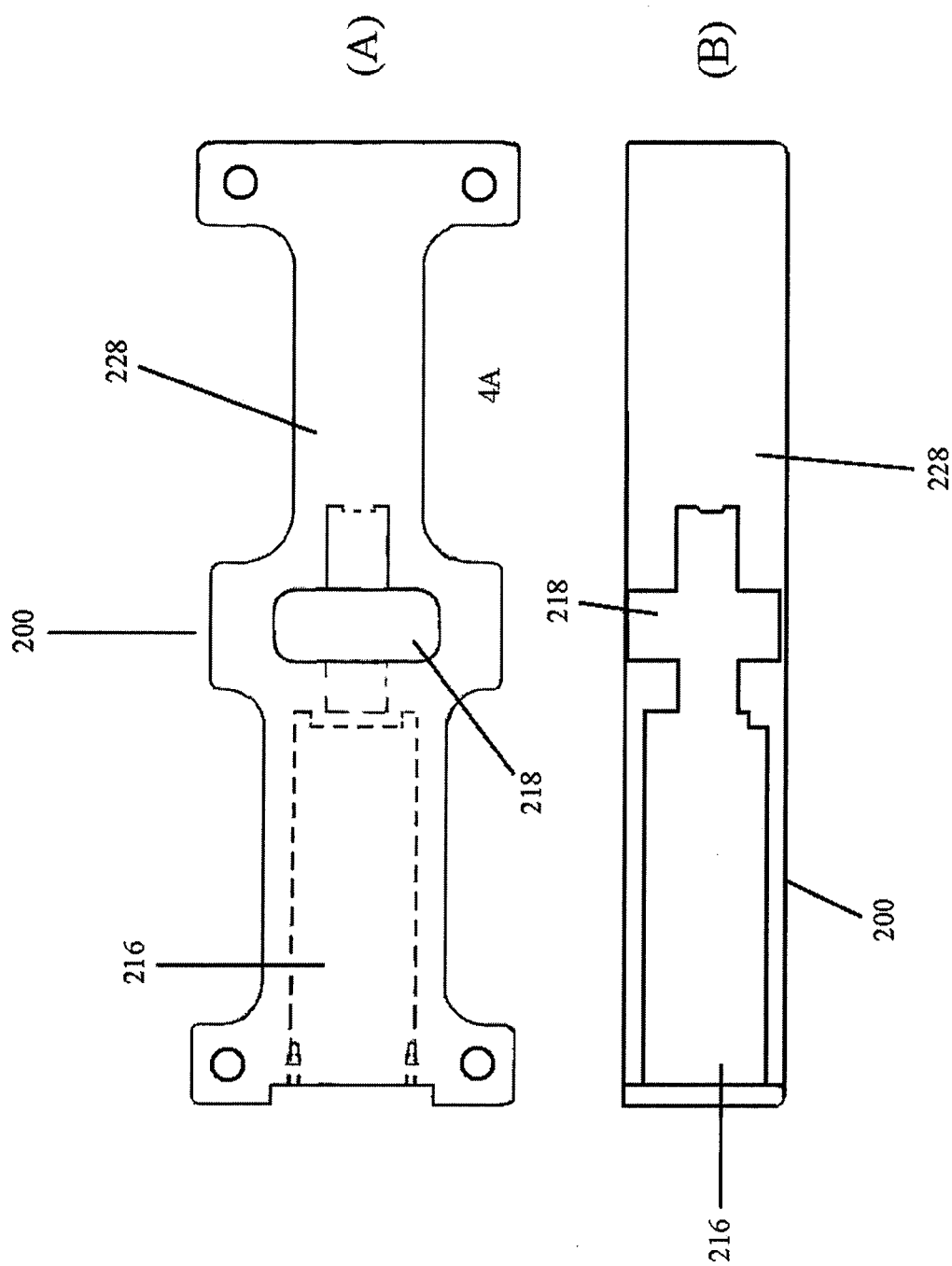
FIGS. 4A and 4B illustrate a top view and dissected front view of a weight sensor device according to an embodiment.
Figure 5:
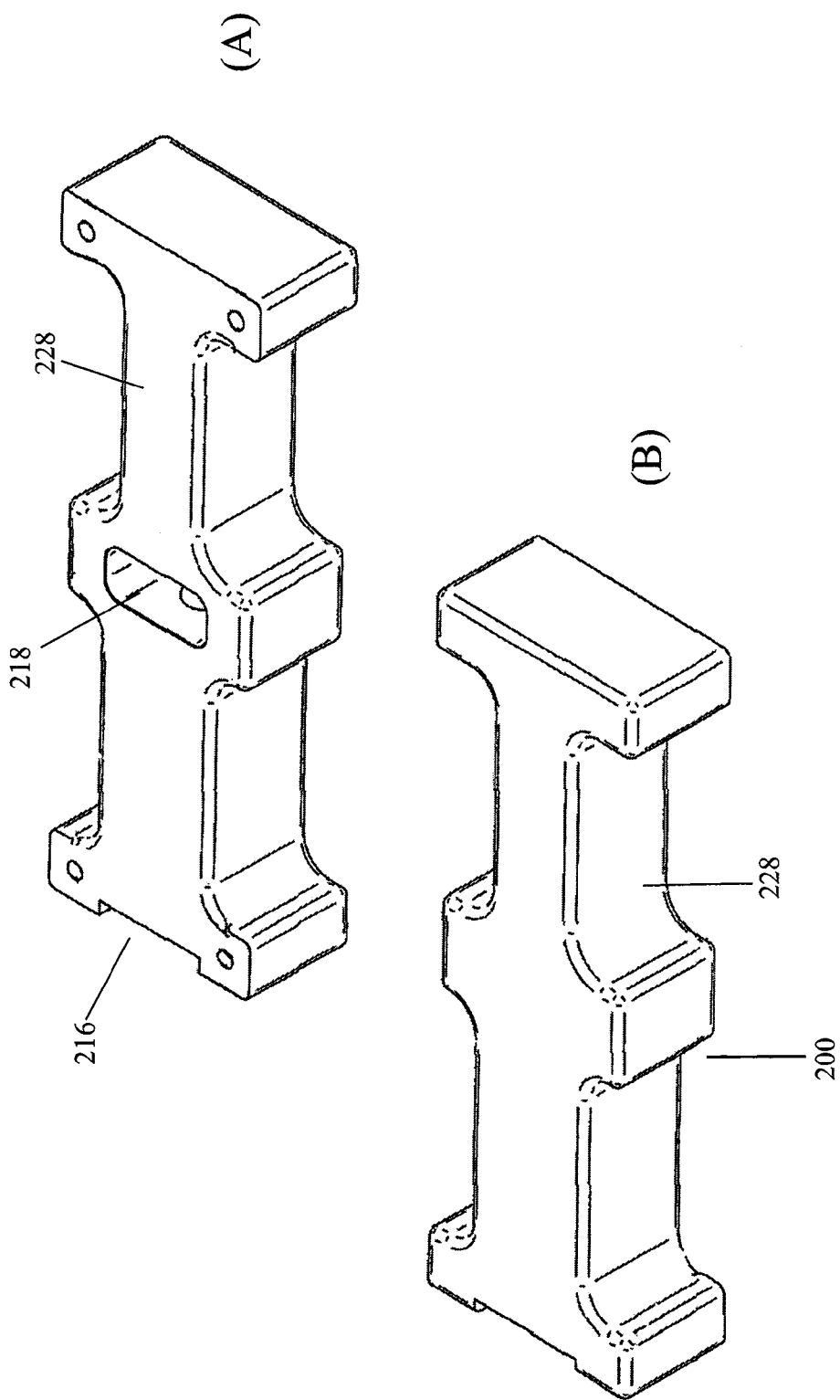
FIGS. 5A and 5B illustrate perspective views of a weight sensor device according to an embodiment.

With reference to FIGS. 2 and 3, an exemplary embodiment of the weight sensor device 70 is illustrated in more detail. The weight sensor device 70 includes a base 200, the base 200 configured to support an insert assembly 213, a cable clamping assembly 230, and a load pin 220.

With reference to FIGS. 4A, 4B, 5A, and 5B, the base 200 comprises a housing 228 having a load pin receptacle 216 and an insert receptacle 218. In various exemplary embodiments, load pin receptacle 216 intersects insert receptacle 218. Load pin receptacle 216 is configured to receive load pin 220. Insert receptacle 218 is configured to receive insert assembly 213. In an exemplary embodiment, housing 228 is a non-load sensing member.

Figure 6:
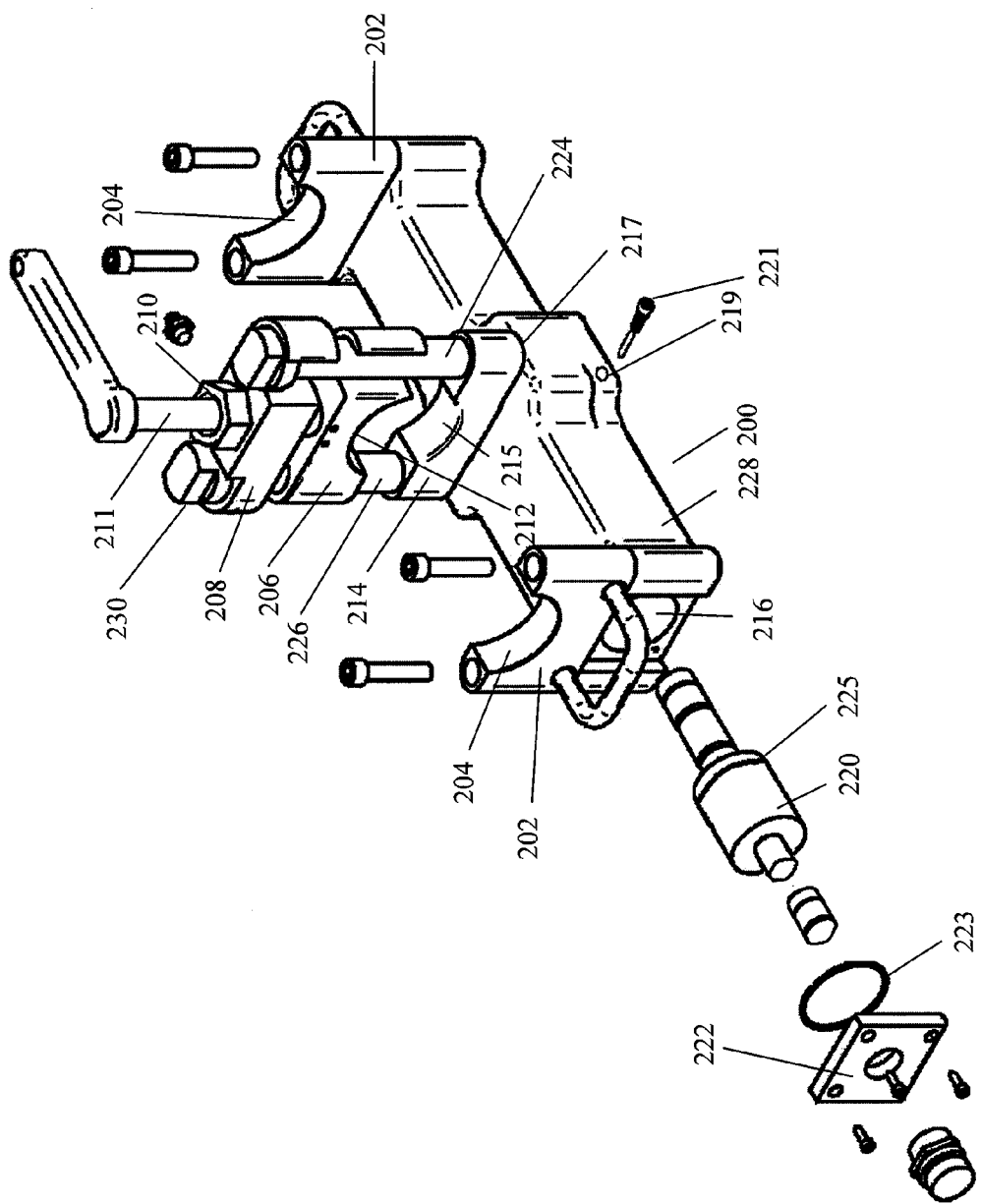
FIG. 6 illustrates an exploded diagram of a weight sensor device according to an embodiment.

With reference to FIG. 6, housing 228 further comprises two cable nests 202. Each cable nest 202 includes a cable support face 204. The cable support faces 204 are concave and configured to support the support cable 80.

One of each cable nest 202 is attached at each end of housing 228. For example, cable nests 202 may be welded, screwed, or press-fit into housing 228. However, any means of achieving a suitable attachment between cable nests 202 and housing 228 is in accordance with the present invention. In various exemplary embodiments, cable nests 202 are equidistant from insert receptacle 218, though in some embodiments, cable nests 202 may be located at varying distances from insert receptacle 218.

Figure 7:
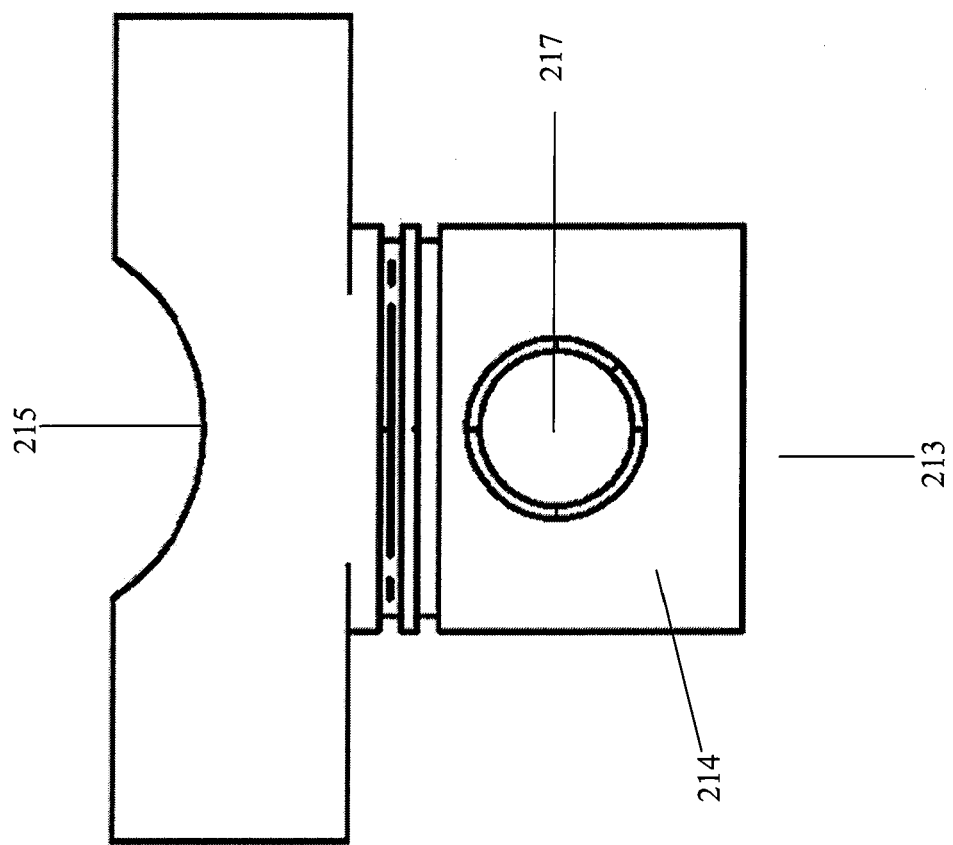
FIG. 7 illustrates a front view of an insert base in accordance with an embodiment of the weight sensor device.

With reference to FIG. 7, insert assembly 213 comprises an insert base 214 and a cable deflecting face 215. Insert base 214 is configured to engage into insert receptacle 218 within housing 228. Insert base 214 is secured into insert receptacle 218 by load pin 220.

In an exemplary embodiment, insert assembly 213 further comprises an aperture 217 capable of receiving an end of load pin assembly 220. The aperture may be, for example, a round hole in the portion of insert base 214 that engages into housing 228.

In an exemplary embodiment, insert assembly 213 further comprises one or more seals. Seals may be attached to insert base 214, and may come into contact with housing 228 when insert base 214 is inserted into insert receptacle 218. Seals may provide further protection against the elements by providing a gas and/or liquid proof seal between the insert assembly 213 and housing 228. Exemplary seals include silicone rubber o-rings, though any other material capable of providing a desired seal may also be used.

Returning to FIG. 6, in an exemplary embodiment, insert assembly 213 further comprises a stanchion 224 and a pivot stanchion 226. Both stanchions may be attached to insert base 214. For example, stanchions 224 and 226 may be screwed, welded, or press-fit into insert base 214. However, any means of achieving suitable attachment between stanchions 224 and 226 and insert base 214 is in accordance with the present invention.

Cable clamping assembly 230 comprises a cable pressure block 206 and a cable deflecting face 212. Cable clamp assembly 230 may be secured to the insert assembly 213 which is, in this embodiment, positioned equidistant between the two cable nests 202.

In an exemplary embodiment, cable clamp assembly 230 further comprises a clamp swing 208, a clamp securing nut 210, and a clamp support post 211. Clamp pressure block 206 and clamp swing 208 engage stanchion 224 and pivot stanchion 226. Clamp pressure block 206 and clamp swing 208 are attached to clamp support post 211 and secured by means of clamp securing nut 210. The clamp swing 208 may rotate between open and closed positions. In the closed position, clamp swing 208 is engaged with stanchion 224. In the open position, clamp swing 208 is not engaged with stanchion 224, and is free to pivot about pivot stanchion 226. The ability of the clamp swing 208 to rotate between open and closed positions by pivoting allows the weight sensor 70 to be attached and detached from support cable 80 simply and quickly and without otherwise dismantling the support cable 80 and/or other portions of the oil rig. As a result, ease of installation and repair of weight sensor 70 is significantly improved from the prior art.

When cable clamp assembly 230 is installed, weight sensor 70 is positioned so that support cable 80 is supported at each end of the base 200 by the two cable nests 202. Cable clamp assembly 230 secures support cable 80 against cable nests 202. As the cable clamp assembly is secured against support cable 80, cable pressure block 206 causes cable support faces 204 to come into contact with support cable 80. As a result, support cable 80 is deflected between the cable pressure block 206 and the cable nests 202. The combination of weight placed on support cable 80 and the deflection in support cable 80 creates a force against insert assembly 213. This force is proportional to the amount of weight supported by support cable 80 and as described herein, allows the amount of weight on support cable 80 to be determined.

Load pin 220 slidingly engages into the housing through load pin receptacle 216. Load pin 220 further engages insert assembly 213. In an exemplary embodiment, load pin 220 is inserted into load pin receptacle 216 and secures insert assembly 213 by engaging aperture 217.

In an exemplary embodiment, load pin 220 may further comprise a load pin fastener 222. Load pin fastener 222 helps secure load pin 220 within housing 228. Load pin fastener 222 may be for example a nut, cotter pin, mounting plate, or snap ring. However, any means of helping to achieve suitable insertion of load pin 220 to housing 228 is in accordance with the present invention.

In various embodiments, load pin 220 requires a particular orientation to properly measure the tension in the cable to which it is attached. An improper rotational alignment may cause load pin 220 to fail to provide an accurate measurement and/or may damage load pin 220. Thus, in an exemplary embodiment, an alignment pin 221 facilitates engaging and orienting load pin 220.

In such embodiments, housing 228 further comprises an alignment pin aperture 219 and load pin 220 comprises a load pin alignment slot 225. Alignment pin 221 passes through alignment pin aperture 219 and into load pin alignment slot 225. Load pin alignment slot 225 allows load pin 220 to be properly oriented within load pin receptacle 216. Specifically, alignment pin 221 properly aligns load pin 220 laterally within load pin receptacle 216 to ensure the correct depth of insertion. Alignment pin 221 may also properly orient load pin 220 rotationally within load pin receptacle 216. As such, alignment pin 221, alignment pin aperture 219, and load pin alignment slot 225 facilitate the ease and accuracy of the replacement of load pin 220 by ensuring proper installation of load pin 220 into housing 228.

In an exemplary embodiment, housing 228 further comprises one or more seals. The seals may provide further protection against the elements by providing a gas and/or liquid proof seal between housing 228 and load pin receptacle 216, and may come into contact with housing 228 when load pin 220 is inserted into load pin receptacle 216. Exemplary seals include silicone rubber o-rings, though any other material capable of providing a desired seal may also be used.

In an exemplary embodiment of the present invention, load pin 220 may attach to and secure the insert assembly 213 by engaging into aperture 217 in insert base 214. In this configuration, the force generated by weight and deflection of the support cable 80 is transmitted as a lift force on the insert base 214 against load pin 220. As a result, the tension in support cable 80 acts directly on load pin 220. Load pin 220 then transmits an electronic output signal which is proportional to the tension in support cable 80 to a readout display.

For example, in an exemplary embodiment, the force on load pin 220 is proportional to the force required for support cable 80 to resist deflection caused by the weight sensor device. The force on load pin 220 is a function of the relative heights of and distance between cable nests 202 and insert base 214. Therefore, it is possible to change the force on load pin 220 by altering either or both of the relative heights of or distance between cable nests 202 and insert base 214. These changes may be made, for example, by substituting cable nests 202 or insert bases 214 of different heights, which, in turn, change the force on load pin 220. For example, a cable configured to support 100,000 lbs may utilize a weight sensor with a 5,000 lb capacity load pin if the cable nests 202, insert base 214, and housing 228 are configured accordingly. In addition, because the calibration and accuracy of the weight sensor device is determined by the particular load pin that is utilized, the calibration and accuracy of the weight sensor may also be changed by selecting and installing a load pin with different characteristics.

In an exemplary embodiment, load pin 220 is an electrically sealed unit. Load pin 220 may be configured for use in explosive environments by, for example, providing a low power, low energy circuit. Load pin 220 may conform to various international standards that relate to the use of electronic devices in hazardous and explosive environments. For example, load pin 220 may conform to ATEX Directive 94/9/EC, which is required for use in explosive environments within the countries of the European Union. The load pin may conform to the IEC/EN 60079-(series) of standards, which characterizes electrical equipment for use in hazardous areas. Similarly, the load pin may conform to the ISA 60079-(Series) of standards, which are commonly used in the United States.

If an electrically sealed load pin 220 is used, the weight sensor device may only be required to conform to International Protection Rating IP20. In this configuration, in the event of failure or malfunction of the load pin, the load pin may be replaced by a load pin with the same hazardous area certification (i.e., an electrically sealed load pin), which would maintain the certification rating of the weight sensor device.

Thus, the weight sensor device of the present invention provides an easily repairable device that may accurately measure cable tension and amount of weight supported under harsh operating conditions. Existing weight sensor devices in the field typically use either hydraulic tension transducers or strain gages. These approaches are often expensive to manufacture. Additionally, in the event of a failure or malfunction of the device, the device cannot be repaired quickly or inexpensively, and often causes significant downtime and expense. The weight sensor device of the current invention provides an apparatus that is more cost effective to operate and maintain than previous devices.

Finally, the present invention has been described above with reference to a number of exemplary embodiments. It should be appreciated that the particular embodiments shown and described herein are illustrative of the invention and its best mode and are not intended to limit in any way the scope of the invention. Those skilled in the art having read this disclosure will recognize that changes and modifications may be made to the exemplary embodiments without departing from the scope of the present invention. For example, various aspects and embodiments of this invention may be applied to fields of use other than oil well drilling, including overhead weight support in manufacturing facilities as well as any other applications in which the present invention would prove suitable. Although certain preferred aspects of the invention are described herein in terms of exemplary embodiments, such aspects of the invention may be achieved through any number of suitable means now known or hereafter devised. Accordingly, these and other changes or modifications are intended to be included within the scope of the present invention.

The invention claimed is:

1. A device for measuring load on a cable comprising:
   a housing comprising a load pin receptacle and an insert receptacle, wherein the load pin receptacle and insert receptacle intersect with each other, and wherein said housing further comprises an alignment pin aperture;
   a load pin;
   an insert;
   a cable nest secured to each end of said housing; and
   a cable clamping mechanism attached to said insert.

2. The device of claim 1, wherein said housing is non-load sensing.

3. The device of claim 2, wherein said housing is configured in an approximately rectangular configuration.

4. The device of claim 1, wherein said load pin further comprises a force sensor.

5. The device of claim 1, wherein said insert is a clevis block.

6. The device of claim 1, wherein said load pin further comprises a load pin alignment slot.

7. The device of claim 6, further comprising an alignment pin.

8. The device of claim 1, wherein said cable nests are positioned equidistant from said insert receptacle.

9. The device of claim 1, wherein said cable nests further comprise a cable support face, the cable support face comprising a curved contour.

10. A device for measuring load on a cable comprising:
a housing comprising a load pin receptacle and an insert receptacle, wherein the load pin receptacle and insert receptacle intersect with each other, and wherein said housing further comprises an alignment pin aperture;
an insert
a load pin; and
cable nests secured to each end of said housing.

11. The device of claim 10, wherein said insert is a clevis block.

12. The device of claim 10, wherein said cable nests are positioned equidistant from said insert.

13. The device of claim 10, wherein said cable nests further comprise a cable support face, the cable support face comprising a curved contour.

14. The device of claim 10, wherein said load pin further comprises a load pin alignment slot.

15. The device of claim 14, further comprising an alignment pin.

16. The device of claim 10, wherein said housing is configured in an approximately rectangular configuration.

* * * * *